Patented June 10, 1930

1,762,979

UNITED STATES PATENT OFFICE

IVAN GUBELMANN AND CLYDE O. HENKE, OF SOUTH MILWAUKEE, WISCONSIN, ASSIGNORS TO THE NEWPORT COMPANY, OF CARROLLVILLE, WISCONSIN, A CORPORATION OF DELAWARE

PROCESS OF RECOVERING RESORCINOL

No Drawing.    Application filed December 24, 1927.    Serial No. 242,514.

This invention relates to a process for the recovery of resorcinol when resorcinol is used or the purification and decolorizing of rosins.

In our co-pending application entitled: "Process of purifying and decolorizing rosins with resorcinol," Serial No. 208,407, filed July 25, 1927, of which the present application is a continuation in part, we have described a method of obtaining high-grade rosins by the purification of low-grade rosins by means of resorcinol. Inasmuch as the resorcinol used as a solvent for the impurities normally contained in rosin is more costly than the rosin itself, it is extremely important from a commercial standpoint that practically all of the resorcinol be recovered for reuse.

It is therefore an object of this invention to provide a method for the recovery of resorcinol from the state in which it is obtained when used as a solvent for extracting impurities and coloring matter from low-grade rosins.

Other and further important objects of this invention will become apparent from the following description and appended claims.

In our process above referred to, either resinous matters dissolved in a rosin solvent, as obtained in the usual solvent extraction of wood to obtain wood rosin, or low-grade rosins dissolved in a suitable solvent, are treated with resorcinol at an elevated temperature and the mass then cooled which gives us a solution of purified rosin and a dark mass consisting principally of resorcinol and extracted color bodies. The solution containing the purified rosin is separated from the resorcinol mass and the purified rosin recovered from its solution. Although at the temperatures employed during the separation of the rosin solution from the resorcinol mass, the resorcinol is very little soluble in the rosin solution, it is necessary for economical reasons to recover even the small quanties of resorcinol dissolved in the rosin solution.

According to our process, this is accomplished by extraction with water, whereby the resorcinol, on account of its high solubility in water and low solubility in ordinary rosin solvents, may be easily recovered in the form of a weak water solution of resorcinol. By ordinary rosin solvents, it is meant to include such solvents as gasoline, petroleum naphtha, petroleum ether, benzene, toluene, chlorine substituted hydrocarbons such as tetrachlorethane, turpentine, pine oils and the like. The dilute water extract of resorcinol is then employed to extract the resorcinol from the resorcinol mass containing the rosin impurities and coloring matters. By treating this mass with the dilute water extract, either cold or hot, but preferably hot, the resorcinol is dissolved away from the magma, leaving the impurities and coloring matter practically undissolved. The resulting more concentrated resorcinol solution is then evaporated and the resorcinol is obtained as the residue. Evaporation may be continued until the resorcinol content reaches about 90%. If desired, the resorcinol may be further purified by distillation in vacuo.

For re-use in subsequent purifying operations, the resorcinol obtained by simple evaporation has been found of satisfactory quality, as the presence of small quantities of impurities is not detrimental. During the evaporation some of the resorcinol distills over with the water, but this resorcinol can also be conserved by re-use of the distillate for extracting other portions of resorcinol from the rosin solution.

By following this general method, it has been found possible to obtain over 99% recovery of the resorcinol.

It was surprising to find that practically all of the resorcinol contained in the rosin solution and in the resorcinol mass could be recovered by simple extraction with water and that the recovered resorcinol as obtained by evaporation of the water extracts would be of sufficiently high purity for reuse.

Without limiting our invention to any particular procedure, the following example, in which parts by weight are given, will serve to illustrate our method in its preferred form.

*Example.*—To 1920 parts of a petroleum naphtha solution containing about 200 parts of rosin, at 90 to 95° C., are added while agitating, 40 parts of resorcinol. The resorcinol added may contain some water, say 10%. The mixture is maintained at this temperature under agitation for about 20 minutes and is then cooled to ordinary temperatures, say 20 to 30° C. The rosin solution is then separated from the dark mass consisting principally of resorcinol and color bodies.

It will be understood that the mixture need not be cooled to a point at which the resorcinol mass becomes solid, but that a part of the resorcinol mass may be separated as a liquid while the mixture is still hot.

The rosin solution, after separation from the resorcinol mass, is successively agitated four to six times with a total of 600 parts of water, and after each agitation allowed to stand until separation into layers has been effected. Each time the aqueous layer is separated by gravity from the rosin solution, until finally it is practically free of resorcinol. The successive wash waters containing the resorcinol from the rosin solution are used to treat the separated resorcinol mass containing the impurities.

The main portion of the resorcinol mass is preferably boiled up with the successive wash-waters as obtained above, whereby the resorcinol dissolves in the wash waters and is separated practically completely from the major portion of the pitch and other rosin impurities. The successive washes, after being combined, give a 6 to 7% solution of resorcinol. This resorcinol solution contains some pitch in suspension and in solution. The suspended pitch may be filtered off. The filtrate is then evaporated to a concentration wherein the residue analyzes 85 to 90% resorcinol.

The quantities of water used and the number of washings employed may obviously be varied as required by good operation.

The recovery of the resorcinol by the above method, provided the distillate from the evaporation step is used in subsequent extraction steps, amounts to about 99% of theory or higher. Furthermore, the resorcinol obtained by this method of recovery is entirely suited for re-use in the process for the extraction of coloring matter and impurities from the rosin.

As an alternative procedure to the evaporation step for the recovery of resorcinol from its water solution, the resorcinol may be extracted from its water solution by any other known method, as by means of any volatile resorcinol solvent such as ether or the like.

We are aware that many changes may be made and numerous details of the process may be varied through a wide range without departing from the principles of this invention and we, therefore, do not purpose limiting the patent granted hereon, otherwise than necessitated by the prior art.

We claim as our invention:

1. The process of recovering resorcinol from a resorcinol mass containing impurities extracted from rosin, which comprises dissolving the resorcinol out of the mass with water and recovering the resorcinol from the water solution of the resorcinol.

2. The process of recovering resorcinol from a resorcinol mass containing impurities extracted from rosin, which comprises boiling the mass with water to dissolve the resorcinol, separating the water solution of resorcinol from the undissolved impurities and evaporating off the water to recover the resorcinol content.

3. The process of recovering resorcinol from a mixture containing a purified rosin solution and an impure resorcinol mass, which comprises separating the rosin solution from the resorcinol mass containing the impurities, extracting any resorcinol dissolved in the rosin solution with water, using the resulting dilute resorcinol solution to dissolve the resorcinol away from the impurities in the resorcinol mass and recovering the resorcinol from its resulting water solution by distilling off the water.

4. The process of recovering resorcinol from a mixture containing a purified rosin solution and an impure resorcinol mass, which comprises separating the rosin solution from the resorcinol mass containing the impurities, extracting any resorcinol dissolved in the rosin solution with water, using the resulting dilute resorcinol solution to dissolve the resorcinol away from the impurities in the resorcinol mass, filtering the resorcinol solution so obtained to remove suspended impurities and evaporating the water from the filtered solution to recover resorcinol.

5. The process of recovering resorcinol from a mixture containing a purified rosin solution and an impure resorcinol mass, which comprises separating the rosin solution from the resorcinol mass containing the impurities, extracting any resorcinol dissolved in the rosin solution with water, using the resulting dilute resorcinol solution to dissolve the resorcinol away from the impurities in the resorcinol mass, filtering the resorcinol solution so obtained to remove suspended impurities, evaporating the water from the filtered solution to recover resorcinol, and using the distillate obtained by evaporation of the resorcinol solution in the extraction of resorcinol from a succeeding rosin solution.

6. The process of recovering resorcinol from a resorcinol mass containing impurities extracted from rosin, which comprises boiling the mass with water to dissolve the resorcinol, separating the water solution of resorcinol from the undissolved impurities and recovering the resorcinol content from the water solution.

In testimony whereof we have hereunto subscribed our names at Carrollville, Milwaukee County, Wisconsin.

IVAN GUBELMANN.
CLYDE O. HENKE.